(12) United States Patent
Ketlerius et al.

(10) Patent No.: US 11,084,463 B2
(45) Date of Patent: Aug. 10, 2021

(54) OPTICAL RAIN SENSOR WITH DYNAMIC OPTICAL CONFIGURATION CONTROL COMPRISING A PLURALITY OF PHOTO ELEMENTS EACH CAPABLE OF BEING SELECTIVELY ACTIVATED TO EMIT LIGHT AND DEACTIVATED TO RECEIVE LIGHT

(71) Applicant: Littelfuse, Inc., Chicago, IL (US)

(72) Inventors: Mindaugas Ketlerius, Kaunas (LT);
Liutauras Soliskis, Kaunas (LT)

(73) Assignee: Littelfuse, Inc., Chicago, IL (US)

( * ) Notice: Subject to any disclaimer, the term of this patent is extended or adjusted under 35 U.S.C. 154(b) by 214 days.

(21) Appl. No.: 16/451,778

(22) Filed: Jun. 25, 2019

(65) Prior Publication Data

US 2019/0389431 A1    Dec. 26, 2019

Related U.S. Application Data

(60) Provisional application No. 62/689,509, filed on Jun. 25, 2018.

(51) Int. Cl.
*G01N 21/55*    (2014.01)
*B60S 1/08*    (2006.01)

(52) U.S. Cl.
CPC .................. *B60S 1/0837* (2013.01)

(58) Field of Classification Search
CPC ... H05B 45/60; B60S 1/087; G01N 2021/945; G01N 2021/9586; G01N 21/552; G01N 21/958
USPC ................... 250/221, 214 R, 214.1
See application file for complete search history.

(56) References Cited

U.S. PATENT DOCUMENTS

| 5,661,303 | A | 8/1997 | Teder |
| 5,991,049 | A | 11/1999 | Tanaka et al. |
| 6,806,485 | B2 | 10/2004 | Jackson, Jr. |
| 7,259,363 | B2 | 8/2007 | Deppe et al. |
| 7,312,787 | B2 * | 12/2007 | Fujioka et al. ....... G06F 3/0421 345/156 |

(Continued)

OTHER PUBLICATIONS

International Search Report and Written Opinion for the International Patent Application No. PCT/US2019/039015, dated Sep. 30, 2019, 9 pages.

(Continued)

*Primary Examiner* — Que Tan Le
(74) *Attorney, Agent, or Firm* — Kacvinsky Daisak Bluni PLLC

(57) ABSTRACT

An optical rain sensor for detecting rainfall on a transparent substrate, the optical rain sensor including a housing disposed on a surface of the transparent substrate, a plurality of photo elements disposed within the housing, each photo element capable of being selectively activated to emit light and deactivated to receive light, and a controller operatively connected to the plurality of photo elements and configured to alternatingly drive the plurality of photo elements between a first mode of operation and a second mode of operation, wherein, in the first mode of operation, at least a first photo element is activated and at least a second photo element is deactivated and, in the second mode of operation, at least the second photo element is activated and at least the first photo element is deactivated.

18 Claims, 3 Drawing Sheets

(56) References Cited

U.S. PATENT DOCUMENTS

2011/0242540 A1 10/2011 Shyu et al.
2018/0128942 A1 5/2018 Fesshaie et al.

OTHER PUBLICATIONS

Supplementary European Search Report dated Jul. 7, 2021 for European Patent Application No. 19824479.0.

* cited by examiner

OPTICAL RAIN SENSOR WITH DYNAMIC OPTICAL CONFIGURATION CONTROL COMPRISING A PLURALITY OF PHOTO ELEMENTS EACH CAPABLE OF BEING SELECTIVELY ACTIVATED TO EMIT LIGHT AND DEACTIVATED TO RECEIVE LIGHT

CROSS-REFERENCES TO RELATED APPLICATIONS

This application claims the benefit of U.S. Provisional Patent Application No. 62/689,509, filed Jun. 25, 2018, the entirety of which is incorporated by reference herein.

FIELD OF THE DISCLOSURE

This disclosure relates generally to the field of sensors, and more particularly to an optical rain sensor configured to detect rainfall on a transparent substrate such as an automobile windshield.

BACKGROUND OF THE DISCLOSURE

Modern automobiles are commonly equipped with rain sensors that are configured to detect rainfall on an automobile's windshield. Information gathered from such sensors can be used to automatically activate and vary the speed of an automobile's windshield wipers and/or to control various other systems in an automobile (e.g., a traction control system).

Referring to FIG. 1, a schematic diagram illustrating a top view of a conventional optical rain sensor 10 (hereinafter "the rain sensor 10") is shown. In a typical application, the rain sensor 10 is mounted to an underside (i.e., interior side) of a transparent substrate such as an automobile windshield. The rain sensor 10 includes light emitting elements 12a-f (e.g., light emitting diodes) disposed about a periphery of the rain sensor 10, collimating lenses 14a-f adapted to collimate light emitted by the light emitting elements 12a-f and to direct the collimated light toward respective sensing areas 15a-f on the windshield, focusing lenses 16a-f adapted to receive the collimated light that is reflected off of the windshield and to focus the light, and a light detecting element 17 (e.g., a photodiode) located at the center of the rain sensor 10 that is adapted to receive the focused light from the focusing lenses 16a-f and to convert the received light into an electrical output signal that is transmitted to a controller 18. If water (e.g., rain) is present at one of the sensing areas 15a-f on the exterior of the windshield, a portion of collimated light that strikes the sensing area will be refracted into the water instead of being reflected to a respective focusing lens. Thus, the amount of collimated light that is reflected off of the sensing area of the windshield and received by the light detecting element is generally attenuated relative to when the sensing area of the windshield is dry.

During operation of the rain sensor 10, the controller 18 alternatingly activates and deactivates two groups A and B of the light emitting elements 12a-f and simultaneously monitors output from the light detecting element 17. That is, when the light emitting elements 12a-c are activated the light emitting elements 12d-f are deactivated, and vice versa. When the windshield is dry, the output produced by the light detecting element 17 when group A of the light emitting elements 12a-f is activated will be substantially similar to the output produced by the light detecting element 17 when group B of the light emitting elements 12a-f is activated. However, when the windshield is wet, water may be present at one or more of the sensing areas 15a-f on the windshield. Thus, since some amount of light emitted by one or more of the light emitting elements 12a-f will be refracted at the wet sensing area(s) instead of being reflected to the light detecting element, there will be an imbalance between the output produced by the light detecting element 17 when group A of the light emitting elements 12a-f is activated and the output produced by the light detecting element 17 when group B of the light emitting elements 12a-f is activated. Upon the detection of such an imbalance, the controller 18 may determine that the windshield is wet and may influence the operation of other automobile systems (e.g., windshield wipers) accordingly.

Due to size constraints, optical rain sensors in automobiles typically must be implemented in relatively small form factors. The distance d10 between each of the light emitting elements 12a-f and the light detecting element 17 of the rain sensor 10 is therefore relatively short, and, as shown in FIG. 1B, the angle of incidence $\Theta_i$ of collimated light on the exterior surface of a windshield 26 is relatively small. Particularly, the angle of incidence $\Theta_i$ of the collimated light rays on the windshield 26 is typically smaller than an angle of incidence beyond which the collimated light rays are no longer refracted but are totally reflected, commonly referred to as "the critical angle" ($\Theta_c$). Thus, even when the windshield 26 is dry, an amount of collimated light that strikes the exterior surface of the windshield 26 will be refracted into the exterior air and will not be reflected to the light detecting element 17. This is detrimental to both the efficiency and the sensitivity of the rain sensor 10. Moreover, the relatively small angle of incidence $\Theta_i$ results in a relatively small sensing area (exemplified by sensing area 15a in FIG. 1B) on the windshield 26, which is detrimental to the sensitivity and accuracy of the rain sensor 10.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An optical rain sensor in accordance with an exemplary embodiment of the present disclosure may include a plurality of photo elements, each photo element capable of being selectively activated to emit light and deactivated to receive light, and a controller operatively connected to the plurality of photo elements and configured to alternatingly drive the plurality of photo elements between a first mode of operation and a second mode of operation, wherein, in the first mode of operation, at least a first photo element is activated and at least a second photo element is deactivated, and wherein, in the second mode of operation, at least the second photo element is activated and at least the first photo element is deactivated.

An optical rain sensor in accordance with another exemplary embodiment of the present disclosure may include a housing disposed on a surface of a transparent substrate, a plurality of photo elements disposed within the housing, each photo element capable of being selectively activated to emit light and deactivated to receive light, and a controller operatively connected to the plurality of photo elements and configured to alternatingly drive the plurality of photo elements between a first mode of operation and a second mode of operation, wherein, in the first mode of operation, at least a first photo element is activated and at least a second photo element is deactivated and, in the second mode of operation, at least the second photo element is activated and at least the first photo element is deactivated.

DETAILED DESCRIPTION

An optical rain sensor in accordance with the present disclosure will now be described more fully with reference to the accompanying drawings, in which a preferred embodiment of the optical rain sensor is presented. The optical rain sensor, however, may be embodied in many different forms and should not be construed as being limited to the embodiments set forth herein. Rather, these embodiments are provided so that this disclosure will convey certain exemplary aspects of the optical rain sensor to those skilled in the art.

Figure 2A:
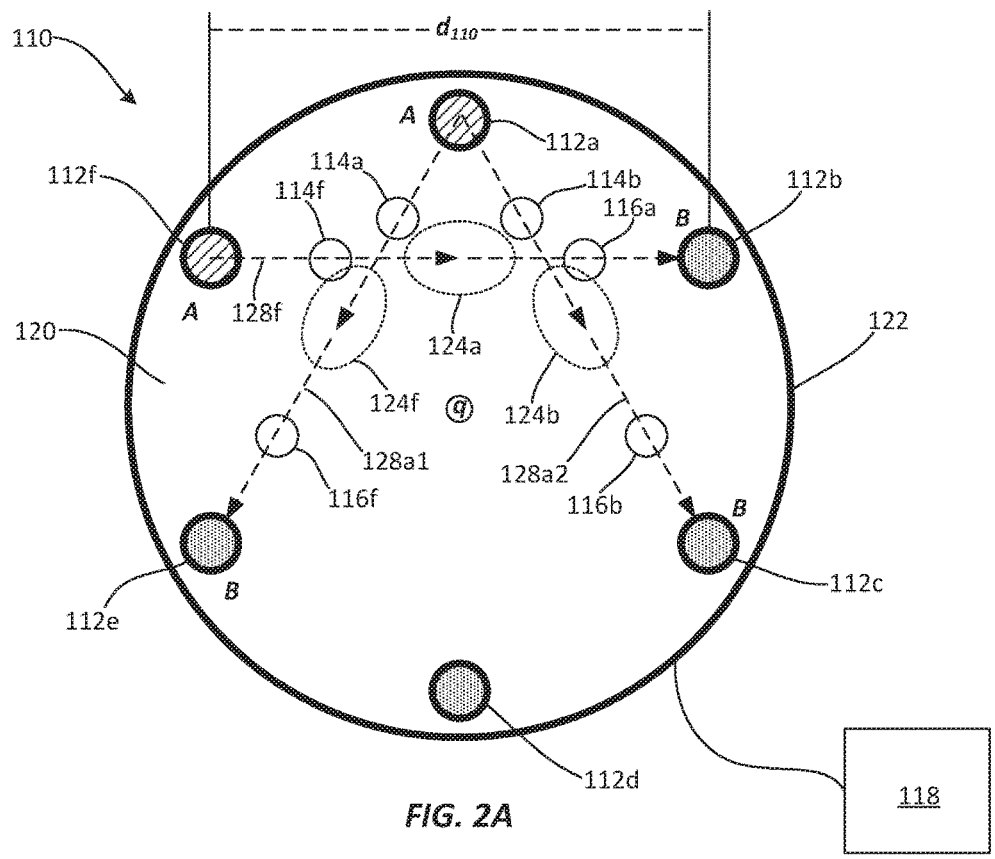
FIG. 2A is schematic diagram illustrating a top view of a rain sensor in accordance with an exemplary embodiment of the present disclosure in a first mode of operation.
Figure 2B:
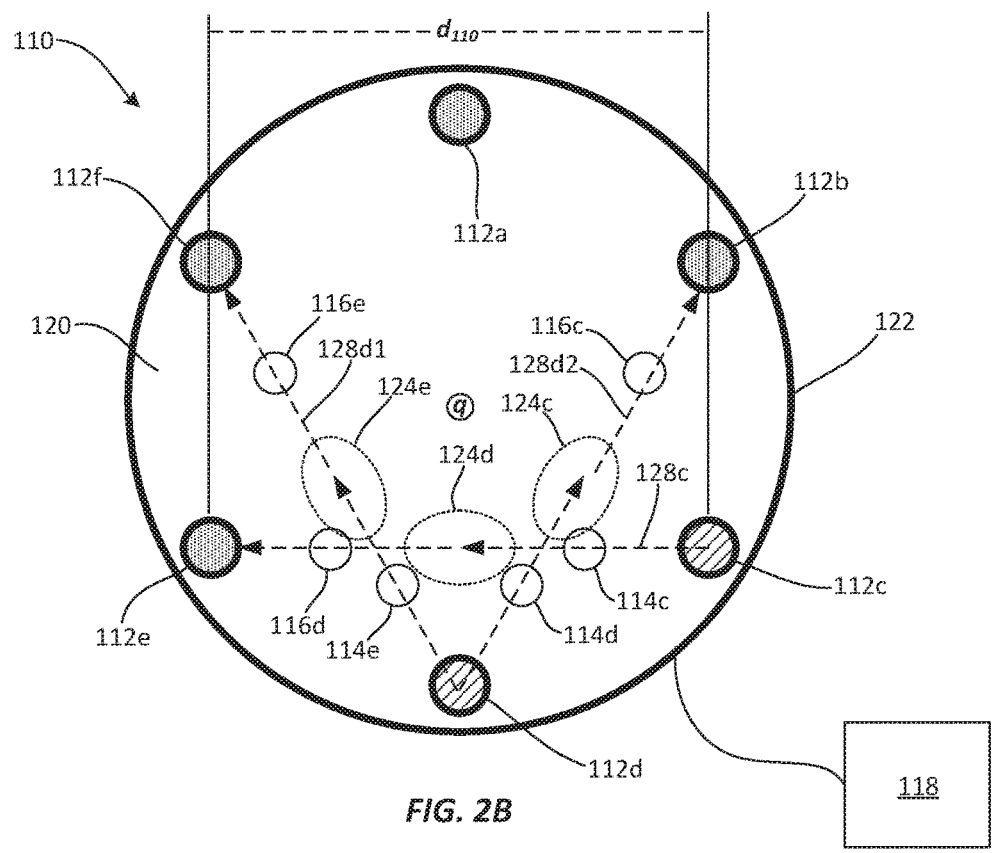
FIG. 2B is schematic diagram illustrating a top view of the rain sensor shown in FIG. 2A in a second mode of operation.

Referring to FIGS. 2A and 2B, schematic diagrams illustrating top views of an optical rain sensor (hereinafter "the rain sensor 110") in accordance with an exemplary embodiment of the present disclosure are shown. In the depicted, non-limiting embodiment, the rain sensor 110 may generally include a plurality of photo elements 112$a$-$f$, a plurality of collimating lenses 114$a$-$f$, and a plurality of focusing lenses 116$a$-$f$ disposed within a housing 122. For the sake of clarity, the collimating lenses 114$c$, 114$d$, and 114$e$ and the focusing lenses 116$c$, 116$d$, 116$e$ are omitted from FIG. 2A, and the collimating lenses 114$a$, 114$b$, 114$f$ and the focusing lenses 116$a$, 116$b$, 116$f$ are omitted from FIG. 2B. The photo elements 112$a$-$f$ may be operatively mounted on a printed circuit board (PCB) 120 in electrical communication with a controller 118 (e.g., a microcontroller, application specific integrated circuit (ASIC), etc.) configured to provide electrical power to, dictate the operation of, and/or gather data from, the photo elements 112$a$-$f$. The collimating lenses 114$a$-$f$ and the focusing lenses 116$a$-$f$ may be disposed intermediate the photo elements 112$a$-$f$ (as further described below) and may be mounted or affixed to the housing 122 (e.g., to a transparent cover of the housing, not shown).

The housing 122 may adapted for installation on or adjacent a transparent substrate. For example, the housing 122 may be mounted on an interior surface of an automobile windshield in a manner that will be familiar to those of ordinary skill in the art. In some embodiments, the controller 118 may be disposed within the housing 122 and mounted on the PCB 120. Alternatively, the controller 118 may be located outside of the housing 122, remote from the PCB 120.

The photo elements 112$a$-$f$ of the rain sensor 100 may be light emitting diodes (LEDs) configured to selectively emit or receive light. For example, each of the photo elements 112$a$-$f$ may be configured to emit light when activated by the controller 118 (i.e., when electrical power is applied thereto by the controller 118), and to receive light and to output a corresponding electrical signal to the controller 18 when deactivated by the controller 118 (i.e., when electrical power is not applied thereto by the controller 118). Thus, each of the photo elements 112$a$-$f$ may be selectively and independently implemented as either a photo emitter or a photosensor as further described below.

The photo elements 112$a$-$f$ may be arranged in a "hexagram configuration" on the PCB 120, with each photo element 112$a$-$f$ disposed at a respective corner of an imaginary hexagram and equidistant from a center point q of such imaginary hexagram. While the figures depict six photo elements 112$a$-$f$, it is contemplated that the number of photo elements in the rain sensor 110 may be varied without departing from the scope of the present disclosure.

Figure 2C:
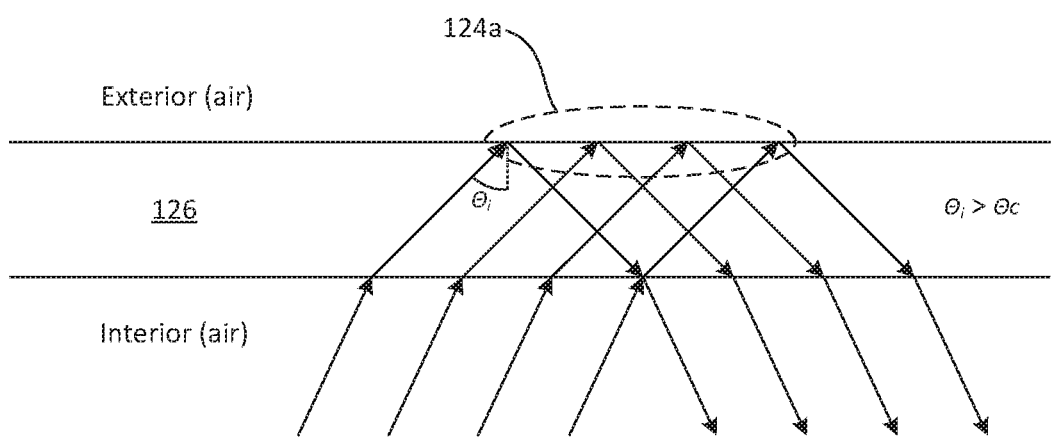
FIG. 2C is schematic diagram illustrating a cross-section of a transparent substrate with light rays emitted by a light emitting element of the rain sensor shown in FIG. 2A incident upon the transparent substrate.

Each of the photo elements 112$a$-$f$ may be configured (e.g., oriented) to emit one or more light beams toward one or more other of the photo elements 112$a$-$f$ as further described below. Each of the collimating lenses 114$a$-$f$ may be configured (e.g., positioned and oriented) to receive and to collimate a light beam emitted by a nearest one of the photo elements 112$a$-$f$ and to direct the collimated light beam toward a respective sensing area 124$a$-$f$ on a transparent substrate 126 (see FIG. 2C) at an oblique angle, where at least a portion of the collimated light beam is reflected off of the transparent substrate 126 as further described below. Each of the focusing lenses 116$a$-$f$ may be configured (e.g., positioned and oriented) to receive light that is reflected off of the transparent substrate 126 and to focus the received light onto a respective, nearest one of the photo elements 112$a$-$f$ as further described below.

During use, the rain sensor 110 may be configured to rapidly and continuously alternate between two modes of operation that are depicted in FIGS. 2A and 2B, respectively. In the first mode of operation shown in FIG. 2A, the controller 118 may activate the photo elements 112$a$ and 112$f$ and may deactivate the photo elements 112$b$-$e$, wherein the photo element 112$a$ is configured to emit light beams 128$a$1 and 128$a$2 toward photo elements 112$c$ and 112$e$, respectively, and wherein the photo element 112$f$ is configured to emit a light beam 128$f$ toward photo element 112$b$. The light beams 128$a$1, 128$a$2, and 128$f$ may be collimated by the collimating lenses 114$a$, 114$b$, and 114$f$, reflected at the sensing areas 124$a$, 124$b$, and 124$f$, and focused by the focusing lenses 116$a$, 116$b$, and 116$f$ in the manner described above, and the resultant light received by the photo elements 112$c$, 112$b$, and 112$e$ may be converted into respective electrical signals that are transmitted to the controller 118. The electrical signals received by the controller 118 may therefore correspond to an amount of lighted reflected at the sensing areas 124$a$, 124$b$, and 124$f$ of the transparent substrate 126.

In the second mode of operation shown in FIG. 2B, the controller 118 may activate the photo elements 112$c$ and 112$d$ and may deactivate the photo elements 112$a$, 112$b$, 112$e$, and 112$f$, wherein the photo element 112$c$ is configured to emit a light beam 128$c$ toward photo element 112$e$, and wherein the photo element 112$d$ is configured to emit light beams 128$d$1 and 128$d$2 toward photo elements 112$b$ and 112f, respectively. The light beams 128c, 128d1, and 128d2 may be collimated by the collimating lenses 114c, 114d, and 114e, reflected at the sensing areas 124c, 124d, and 124e, and focused by the focusing lenses 116c, 116d, and 116e in the manner described above, and the resultant light received by the photo elements 112b, 112e, and 112f may be converted into respective electrical signals that are transmitted to the controller 118. The electrical signals received by the controller 118 may therefore correspond to an amount of lighted reflected at the sensing areas 124c, 124d, and 124e of the transparent substrate 126.

When the transparent substrate 126 is dry, the output produced by the photo elements 112c, 112b, and 112e in the first mode of operation may be substantially equal to the output produced by the photo elements 112b, 112e, and 112f in the second mode of operation. However, when the transparent substrate 126 is wet, water may be present at one or more of the sensing areas 124a-f on the transparent substrate 126. Thus, since some amount of light emitted by one or more of the activated photo elements will be refracted at the wet sensing area(s) instead of being reflected to the respective deactivated photo elements, there will be an imbalance between the output produced by the photo elements 112c, 112b, and 112e in the first mode of operation and the output produced by the photo elements 112b, 112e, and 112f in the second mode of operation. Upon the detection of such an imbalance, the controller 118 may determine that the transparent substrate 126 is wet and may influence the operation of other automobile systems (e.g., windshield wipers) accordingly.

Figure 1A:
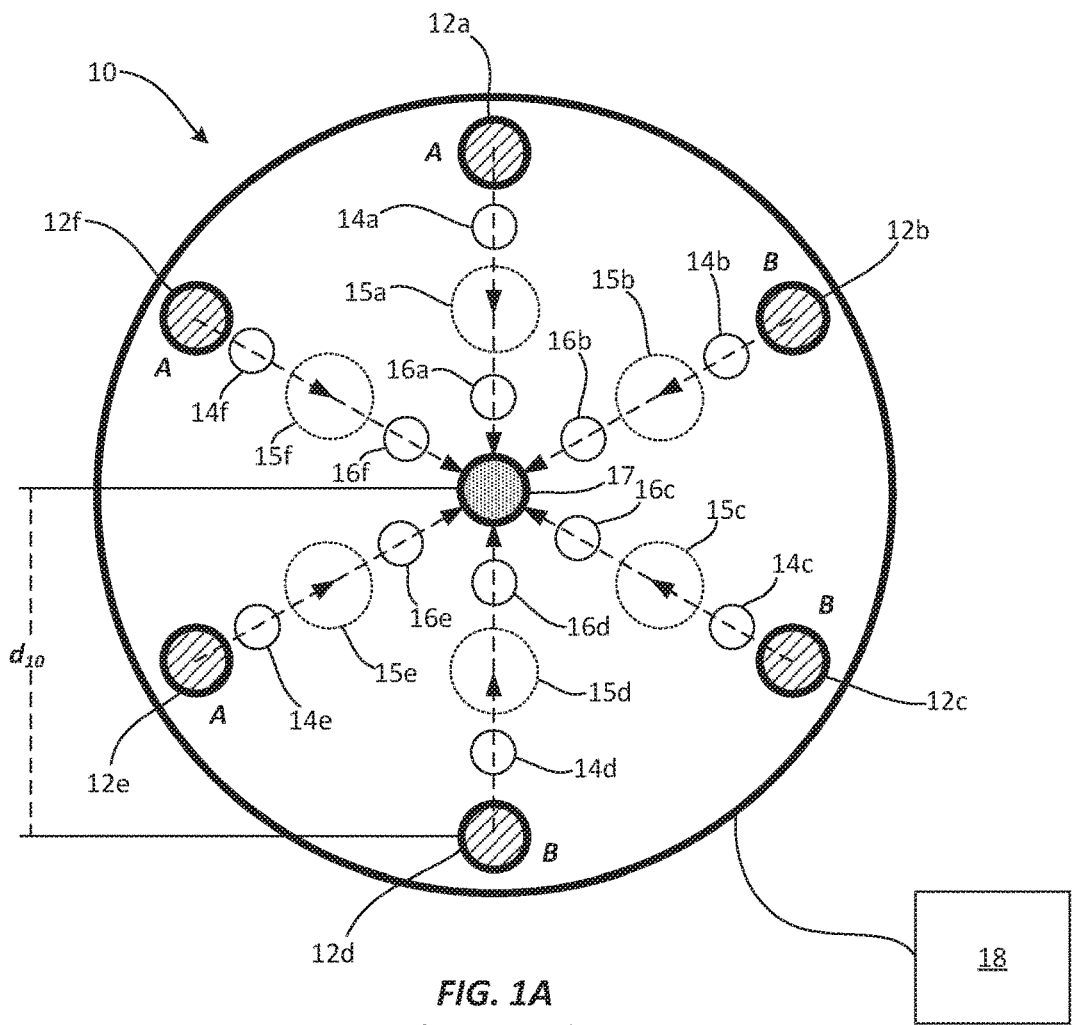
FIG. 1A is schematic diagram illustrating a top view of a conventional rain sensor consistent with the prior art.
Figure 1B:
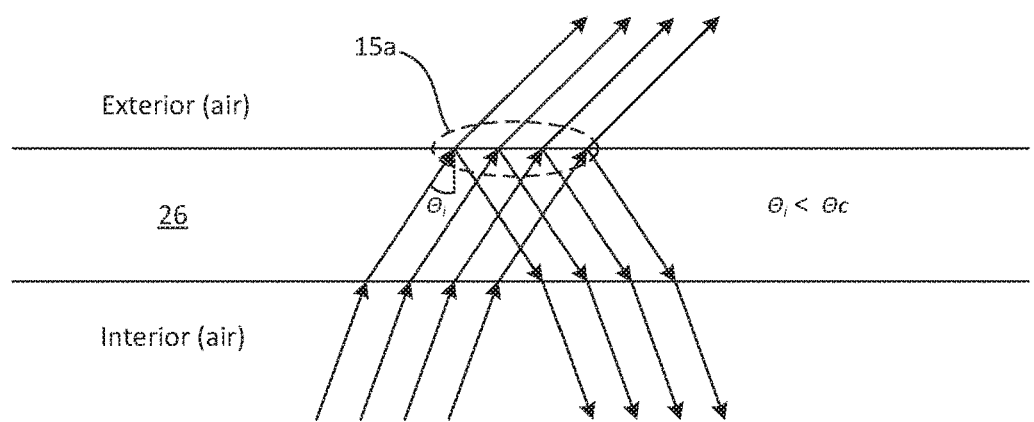
FIG. 1B is schematic diagram illustrating a cross-section of a transparent substrate with light rays emitted by a light emitting element of the rain sensor shown in FIG. 1A incident upon the transparent substrate.

In both of the first and second modes of operation described above, a distance d110 between the activated, light emitting photo elements and the respective, deactivated, light receiving photo elements is greater than the distance d10 between each of the light emitting elements 12a-f and the light receiving element 17 in the conventional rain sensor 10 shown in FIG. 1A. Thus, the distance d100 may be greater than the distance d10 shown in FIG. 1A, while the footprint or outer dimensions of the rain sensor 100 may be the same as or similar to those of the conventional rain sensor 10. Owning to this increase in distance between light emitting and light receiving photo elements in the rain sensor 100 relative to conventional rain sensors, the angle of incidence of collimated light rays on a transparent substrate may be relatively large. Particularly, referring to FIG. 2C, the angle of incidence $\Theta_i$ of light rays produced by the rain sensor 100 on a sensing area (exemplified by sensing area 124a described above) of the transparent substrate 126 may be greater than an angle of incidence beyond which the collimated light rays are no longer refracted but are totally reflected, commonly referred to as "the critical angle" ($\Theta_c$). Thus, total internal reflection (TIR) may be achieved, and when the sensing area 124a of the transparent substrate 126 is substantially dry all of the collimated light that strikes the exterior surface of the transparent substrate 126 will be reflected to a respective photo element of the rain sensor 100. The efficiency and the sensitivity of the rain sensor 100 are therefore improved relative to conventional rain sensors. Moreover, the relatively large angle of incidence $\Theta_i$ facilitated by the configuration of the rain sensor 100 results in relatively large sensing areas (exemplified by sensing area 124a in FIG. 2C) on the transparent substrate 126, which provides the rain sensor 100 with greater sensitivity and accuracy relative to conventional rain sensors.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An optical rain sensor comprising:
a plurality of photo elements, each photo element capable of being selectively activated to emit light and deactivated to receive light; and
a controller operatively connected to the plurality of photo elements and configured to alternatingly drive the plurality of photo elements between a first mode of operation and a second mode of operation, wherein, in the first mode of operation, at least a first photo element is activated and at least a second photo element is deactivated, and wherein, in the second mode of operation, at least the second photo element is activated and at least the first photo element is deactivated.

2. The optical rain sensor of claim 1, wherein, in the first mode of operation, at least one of the plurality of photo elements is adapted to receive light emitted by the first photo element and to output a corresponding first electrical signal to the controller, and wherein, in the second mode of operation, at least one of the plurality of photo elements is configured to receive light emitted by the second photo element and to output a corresponding second electrical signal to the controller.

3. The optical rain sensor of claim 2, wherein the controller is adapted to compare the first electrical signal to the second electrical signal.

4. The optical rain sensor of claim 1, wherein at least one of the photo elements is configured to project a light ray onto a transparent substrate, wherein an angle of incidence of the light ray striking the transparent substrate is greater than a corresponding critical angle.

5. The optical rain sensor of claim 1, further comprising a collimating lens and a focusing lens disposed along a path extending between two of the photo elements.

6. The optical rain sensor of claim 1, wherein the plurality of photo elements comprises five photo elements arranged in a hexagram configuration.

7. The optical rain sensor of claim 6, wherein, in the first mode of operation, a first of the photo elements is configured to project light rays toward a second and a third of the photo elements, and a fourth of the photo elements is configured to project a light ray toward a fifth of the photo elements.

8. The optical rain sensor of claim 7, wherein, in the second mode of operation, the second photo element is configured to project a light ray toward the third photo element and a sixth of the photo elements is configured to project light rays toward the fourth and fifth photo elements.

9. The optical rain sensor of claim 8, further comprising a first collimating lens and a first focusing lens disposed along a path extending between the first and second photo elements, a second collimating lens and a second focusing lens disposed along a path extending between the first and third photo elements, a third collimating lens and a third focusing lens disposed along a path extending between the fourth and fifth photo elements, a fourth collimating lens and a fourth focusing lens disposed along a path extending between the second and third photo elements, a fifth collimating lens and a fifth focusing lens disposed along a path extending between the sixth and fifth photo elements, and a sixth collimating lens and a sixth focusing lens disposed along a path extending between the sixth and fourth photo elements.

10. An optical rain sensor for detecting rainfall on a transparent substrate, the optical rain sensor comprising:
a housing disposed on a surface of the transparent substrate;
a plurality of photo elements disposed within the housing, each photo element capable of being selectively activated to emit light and deactivated to receive light; and
a controller operatively connected to the plurality of photo elements and configured to alternatingly drive the plurality of photo elements between a first mode of operation and a second mode of operation, wherein, in the first mode of operation, at least a first photo element is activated and at least a second photo element is deactivated and, in the second mode of operation, at least the second photo element is activated and at least the first photo element is deactivated.

11. The optical rain sensor of claim 10, wherein, in the first mode of operation, at least one of the plurality of photo elements is adapted to receive light emitted by the first photo element and reflected off of the transparent substrate and to output a corresponding first electrical signal to the controller, and wherein, in the second mode of operation, at least one of the plurality of photo elements is configured to receive light emitted by the second photo element and reflected off of the transparent substrate and to output a corresponding second electrical signal to the controller.

12. The optical rain sensor of claim 11, wherein the controller is adapted to compare the first electrical signal to the second electrical signal.

13. The optical rain sensor of claim 10, wherein an angle of incidence of light projected onto the transparent substrate by the first photo element is greater than a corresponding critical angle such that all of the light projected onto the transparent substrate by the first photo element is reflected off of the transparent substrate.

14. The optical rain sensor of claim 10, further comprising a collimating lens and a focusing lens disposed along a path extending between two of the photo elements.

15. The optical rain sensor of claim 10, wherein the plurality of photo elements comprises five photo elements disposed on a printed circuit board in a hexagram configuration.

16. The optical rain sensor of claim 15, wherein, in the first mode of operation, a first of the photo elements is configured to project light rays toward a second and a third of the photo elements, and a fourth of the photo elements is configured to project a light ray toward a fifth of the photo elements.

17. The optical rain sensor of claim 16, wherein, in the second mode of operation, the second photo element is configured to project a light ray toward the third photo element and a sixth of the photo elements is configured to project light rays toward the fourth and fifth photo elements.

18. The optical rain sensor of claim 17, further comprising a first collimating lens and a first focusing lens disposed along a path extending between the first and second photo elements, a second collimating lens and a second focusing lens disposed along a path extending between the first and third photo elements, a third collimating lens and a third focusing lens disposed along a path extending between the fourth and fifth photo elements, a fourth collimating lens and a fourth focusing lens disposed along a path extending between the second and third photo elements, a fifth collimating lens and a fifth focusing lens disposed along a path extending between the sixth and fifth photo elements, and a sixth collimating lens and a sixth focusing lens disposed along a path extending between the sixth and fourth photo elements.

* * * * *